US007000322B2

(12) United States Patent
Murphy

(10) Patent No.: US 7,000,322 B2
(45) Date of Patent: Feb. 21, 2006

(54) BLADE ASSEMBLY

(75) Inventor: Stacey A. Murphy, DeKalb, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 319 days.

(21) Appl. No.: 10/637,200

(22) Filed: Aug. 8, 2003

(65) Prior Publication Data

US 2005/0028373 A1  Feb. 10, 2005

(51) Int. Cl.
  *H02G 1/12*  (2006.01)
  *B25B 25/00*  (2006.01)
(52) U.S. Cl. .......................... 30/90.1; 30/357; 81/9.41; 81/9.44
(58) Field of Classification Search ................. 30/90.1, 30/90.4, 90.6, 90.8, 91.2, 279.6; 81/9.41, 81/9.42, 9.43, 9.44, 9.4; 83/620, 861, 881, 83/879, 875, 51, 375, 378, 396, 454, 456, 83/465, 466.1, 567, 385, 383, 382, 947, 580
See application file for complete search history.

(56) References Cited

U.S. PATENT DOCUMENTS

| | | | |
|---|---|---|---|
| 649,039 A | | 5/1900 | Bernard |
| 3,226,815 A | * | 1/1966 | Kelly ........................... 29/867 |
| 3,336,666 A | * | 8/1967 | Calkin ......................... 30/90.1 |
| 3,344,691 A | | 10/1967 | Staggs |
| 3,710,406 A | | 1/1973 | Stanford |
| 4,225,990 A | | 10/1980 | Theiler, Sr. |
| 4,494,428 A | * | 1/1985 | Malof ......................... 83/389 |
| 4,742,746 A | * | 5/1988 | Olsson ......................... 83/387 |
| 4,799,406 A | | 1/1989 | Diaz-De-Guerenu-Aguirrebeitia |
| 4,835,862 A | | 6/1989 | Phillips |
| 4,951,369 A | * | 8/1990 | Verrall ....................... 29/33 M |
| 5,003,846 A | * | 4/1991 | Yagawa ....................... 81/9.42 |
| 5,012,666 A | | 5/1991 | Chen et al. |
| 5,172,620 A | | 12/1992 | Faust |
| 5,269,206 A | | 12/1993 | Yagawa |
| 5,295,421 A | * | 3/1994 | Mansfield ..................... 81/9.4 |
| 5,325,587 A | | 7/1994 | Steiner et al. |
| 5,361,489 A | | 11/1994 | Vatel |
| 5,398,413 A | | 3/1995 | Chen |
| 5,402,561 A | | 4/1995 | Cerquone et al. |

(Continued)

*Primary Examiner*—Boyer D. Ashley
(74) *Attorney, Agent, or Firm*—Cook, Alex, McFarron, Manzo, Cummings & Mehler, Ltd.

(57) ABSTRACT

A laminated blade assembly for cutting the insulation of a wire to permit removal of the insulation from the wire. The blade assembly includes a stationary member and a movable member which are formed to contact each other when moved together to support and cut the insulation of the wire. Each of the members includes a blade sandwiched between a pair of wire insulation supports. A number of grooves of different transverse cross-sectional sizes are formed in each support and are spaced apart from one another in a direction longitudinally of the edge of the support. One of the stationary and one of the movable members is a lower member and the other is an upper member with these members encircling the insulated wire when the members are moved together. Each of the grooves of the lower portion encircle more than one half of the cross-section of the insulated wire. Each of the grooves of the upper portion encircle less than one half of the cross-section of the insulated wire when the support members are moved together. The sharpened edges of the cutter blades are transversely offset relative to the edges of the supports when their blades are moved together to cut the insulation of the wire.

2 Claims, 4 Drawing Sheets

U.S. PATENT DOCUMENTS

| | | |
|---|---|---|
| 5,924,200 A | 7/1999 | College |
| 6,058,606 A | 5/2000 | Hepworth |
| 6,089,125 A * | 7/2000 | Cheng .................... 81/9.44 |
| 6,253,641 B1 | 7/2001 | Tarpill |
| 6,439,084 B1 | 8/2002 | Ebert |
| 6,477,776 B1 | 11/2002 | Jee |

* cited by examiner

BLADE ASSEMBLY

BACKGROUND AND SUMMARY OF THE INVENTION

This invention is concerned with a blade assembly for a precision hand tool useful for stripping the insulation material from an insulated wire which blade assembly has a lower movable portion and an upper fixed portion. The invention is particularly concerned with the wire insulation supports of such a blade assembly.

An object of this invention is the supports of a blade assembly for stripping insulation from an insulated wire which supports more securely hold the insulated wire during the insulation cutting and removal sequence of the operation of the hand tool.

Another object of this invention is the supports for an insulated wire in which each of the support components formed in the lower movable portion of the blade assembly has a greater wire receiving depth than the matching support component of the upper fixed portion of the blade assembly.

Other objects of this invention will be found in the following specification, claims and drawings.

BRIEF DESCRIPTION OF THE DRAWINGS

The invention is illustrated more or less diagrammatically in the following drawings wherein.

DESCRIPTION OF THE PREFERRED EMBODIMENT

FIGS. 1–5 of the drawings show a laminated blade assembly 11 of the type which is used for stripping insulation 13 from conductor wires 15. Hand tools of this general type which use a laminated blade assembly similar to blade assembly 11 are shown in U.S. Pat. Nos. 2,523,936 and 2,889,728, which are owned by the same assignee as the assignee of this specification. Said patents are incorporated by reference in this specification for all purposes and specifically to show the environment in which the laminated blade assembly of this invention is used and to show the operation of said hand tools to cut the insulation 13 and remove a cut sleeve of insulation from a conductor wire 15.

Figure 1:
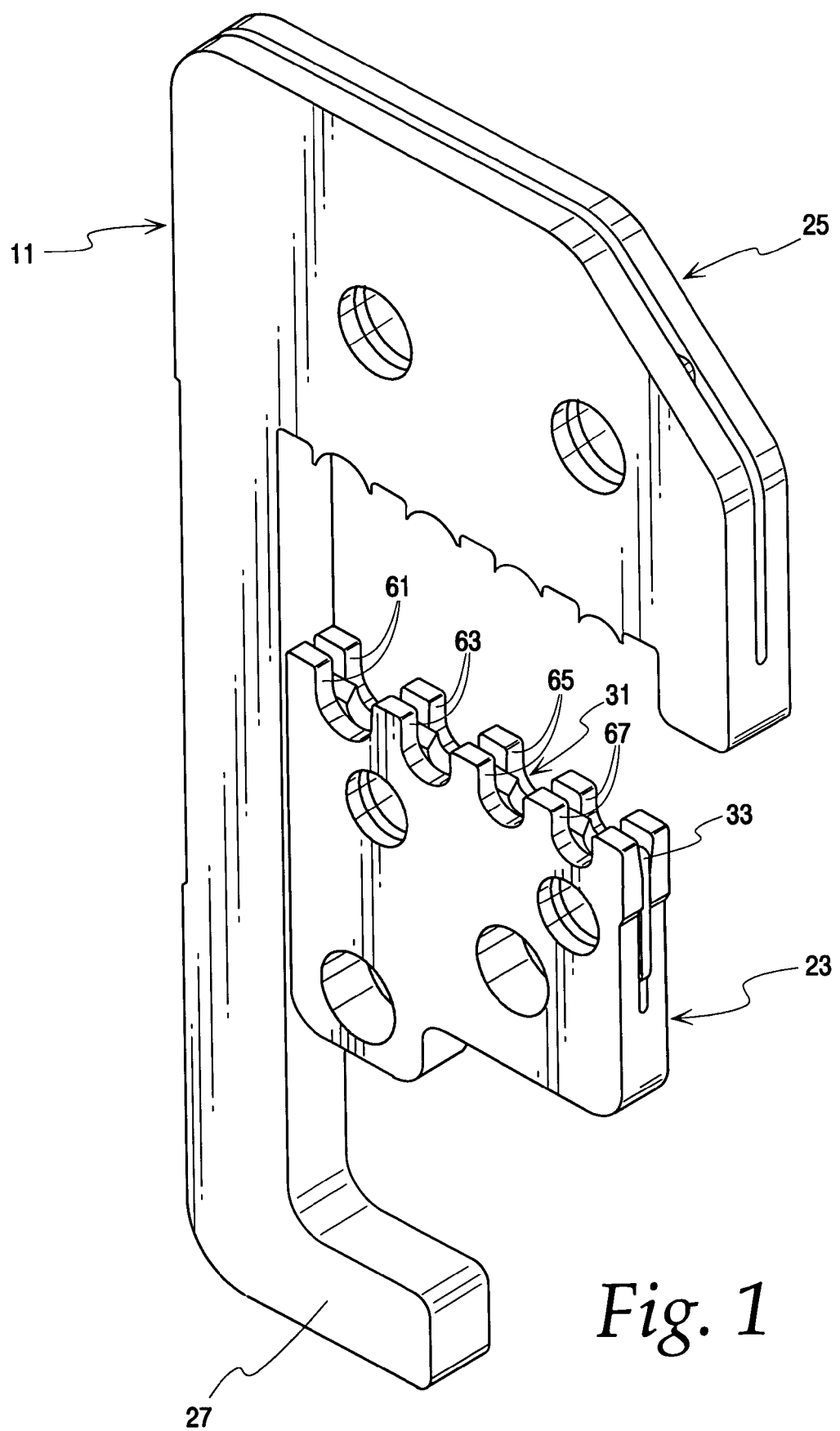
FIG. 1 is a perspective view of a blade assembly of this invention.
Figure 2:
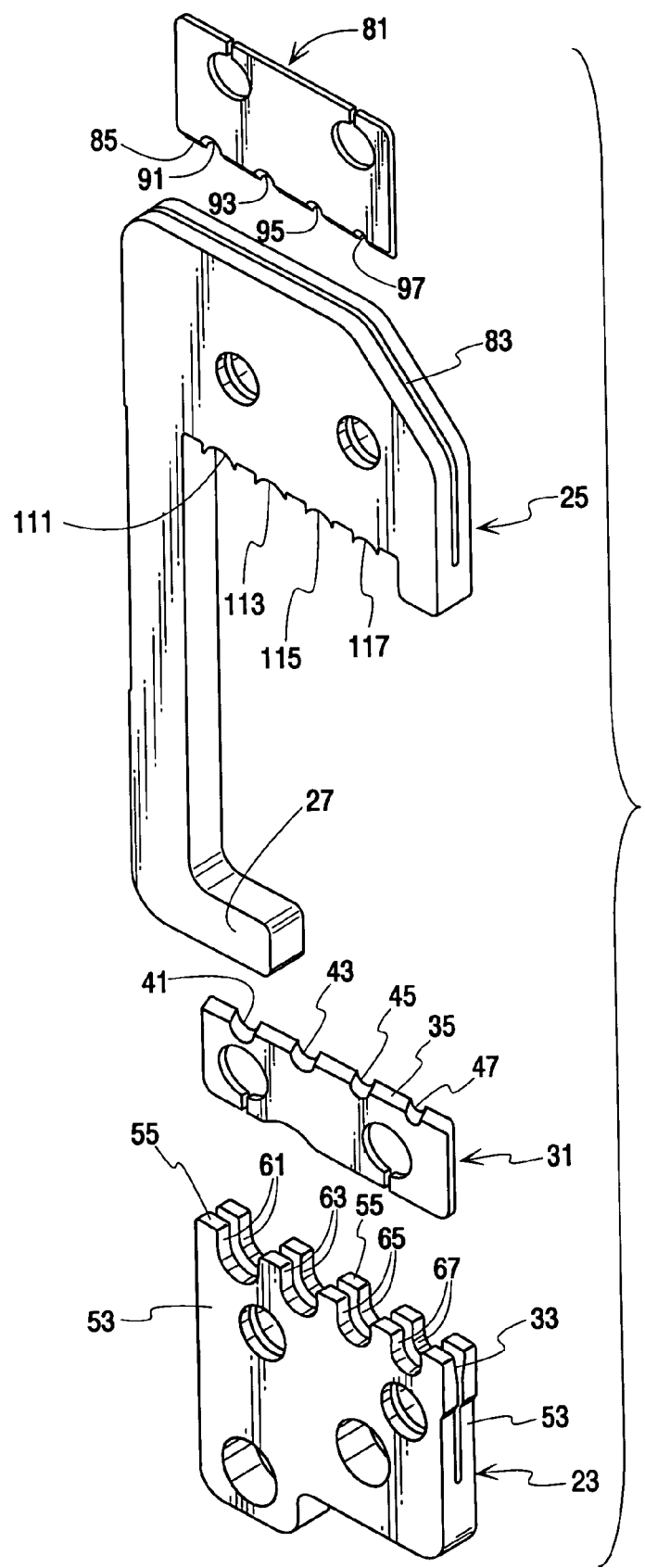
FIG. 2 is an exploded view of the blade assembly of FIG. 1.

As shown in FIGS. 1 and 2 of the drawings, the blade assembly includes a fixed or stationary blade holder assembly 23 and a movable blade holder assembly 25 with a foot 27 formed integrally with the movable blade holder assembly. The foot 27 connects to a link which is connected to a handle of an insulation removing tool as shown in U.S. Pat. Nos. 2,523,936 and 2,889,728 patents are incorporated by reference in this application for all purposes and specifically to show the operation of the hand tools to cut the insulation and remove a cut sleeve of insulation from a conductor wire.

A fixed or stationary cutter blade 31 fits into a slotted pocket 33 formed in the fixed blade holder assembly 23 as shown most clearly in FIG. 1 of the drawing. An incline surface 35 formed on the fixed cutter blade creates a beveled cutting edge. Semicircular notches 41, 43, 45 and 47, shown in FIG. 2, are formed in the inclined surface 35 of the cutter blade and as is conventional, each of these notches is of a different diameter varying from the largest 41, to the smallest 47, with each adapted to cut the insulation of an insulated wire 17 of a selected size.

The slotted pocket 33 divides the fixed blade holder 23 into insulation support plates 53. A support edge 55 is located on the end of each support plate on opposite sides of the blade 31. A series of insulation supporting notches 61, 63, 65 and 67 are formed in the support edge 55 of each support plate 53 with the notches varying in size from the largest notch 61 to the smallest notch 67. As can be seen most clearly in FIGS. 1 and 2, these notches align with complementary notches 41, 43, 45 and 47 in the fixed cutter blade 31. These notches are somewhat U-shaped in diameter having straight walls 69 leading from an arcuate portion 71 at the bottom of each notch. This construction forms a notch which encircles more than one half of the insulation of the wire seated in its notch to better hold the wire in position during cutting and removal of the insulation.

A movable cutting blade 81 fits in a slotted pocket 83 formed in the movable blade holder 25 as shown most clearly in FIG. 2 of the drawings. An inclined surface 85 on the movable blade forms a beveled cutting edge. A series of semi-circular notches 91, 93, 95 and 97 are formed in the inclined surface 85 of the movable blade. These circular notches vary in size from the largest 91 to the smallest 97 and correspond in size to be complementary to the notches 41, 43, 45 and 47 in the fixed cutter blade 31.

The slotted pocket 83 divides the movable blade holder 25 into insulation support plates 105, each having a support edge 107 located on a side of the movable blade 81. A series of notches 111, 113, 115 and 117 are formed in the support edge 107 of each support plate 105 with each notch having an arc of less than 180 degrees and aligning with a complimentary notch 61, 63, 65 and 67 in the support plate 53 of the fixed blade holder 23.

Figure 3:
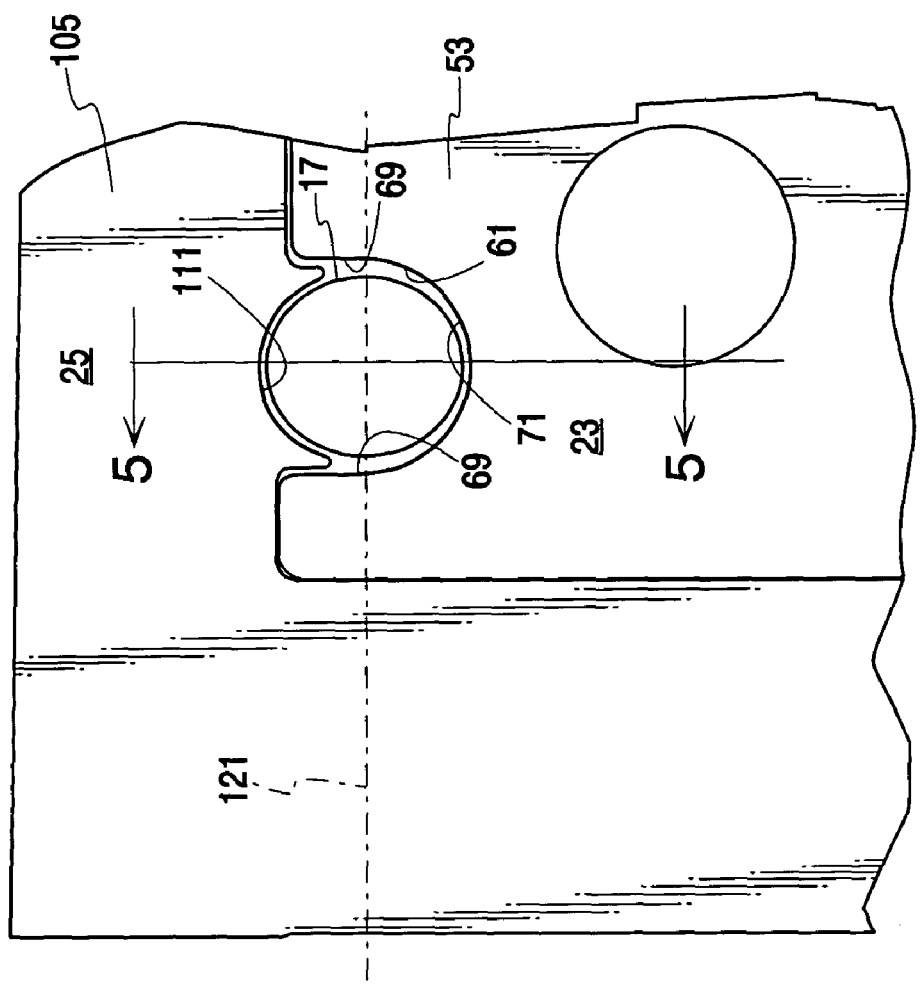
FIG. 3 is a partial, enlarged, plan view of the blade assembly of FIG. 1 showing one set of the wire insulation supports in their moved together insulation supporting positions with the cutting blades omitted for clarity of illustration.

FIG. 3 of the drawings shows a portion of the fixed blade holder 23 and the movable blade holder 25 supporting an insulated wire 17 located in the largest holder formed by notches 61 and 111. It should be noted that the notch 61 has straight walls 69 on opposite sides of its bottom arcuate portion 71 to encircle more than one half of the circumference of the insulated wire 17. The upper support notch 111 is arcuate but with an arc of less than 180 degrees and, in effect, fits inside the notch 61 to engage the upper circumference of the insulated wire. This construction provides a deeper socket on the lower portion of the insulated wire providing greater support during cutting of the insulation. It should be noted that the area encircled by the upper support notch 111 ends well above the center line 121 of the insulated wire 17.

Figure 4:
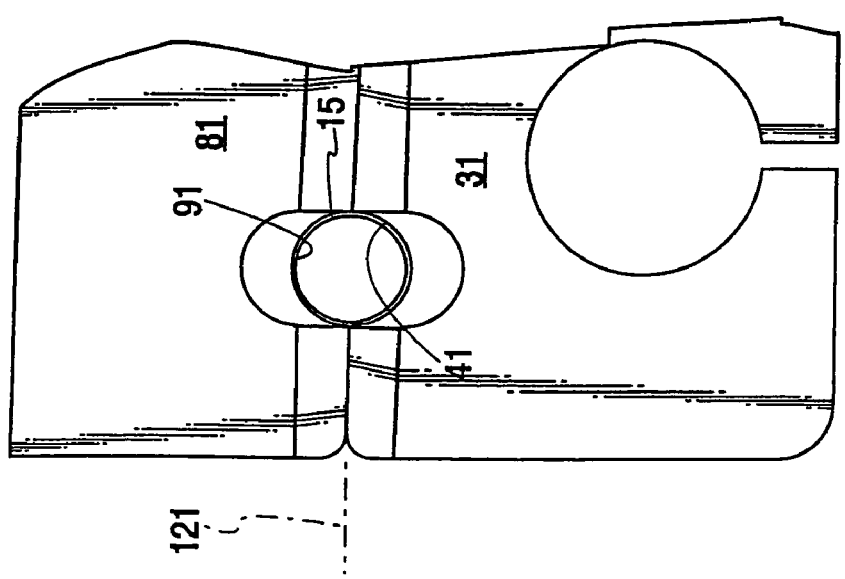
FIG. 4 is a partial, enlarged, plan view of the blade assembly of FIG. 1 showing the wire insulation cutting blades in their moved together insulation cutting positions with the insulation supporting members omitted for clarity of illustration.

FIG. 4 of the drawings complements FIG. 3 in showing a fixed blade 31 and movable blade 81 in their cutting positions when the holders 23 and 25 are in the positions shown in FIG. 3 of the drawings. It should be noted that the notches 41 and 91 of the blades 31 and 81 respectively are of the same size and their blades come together at the center line 121 of the insulated wire 17 being offset below the plane where the notches 61 and 111 of the insulation holders come together.

Figure 5:
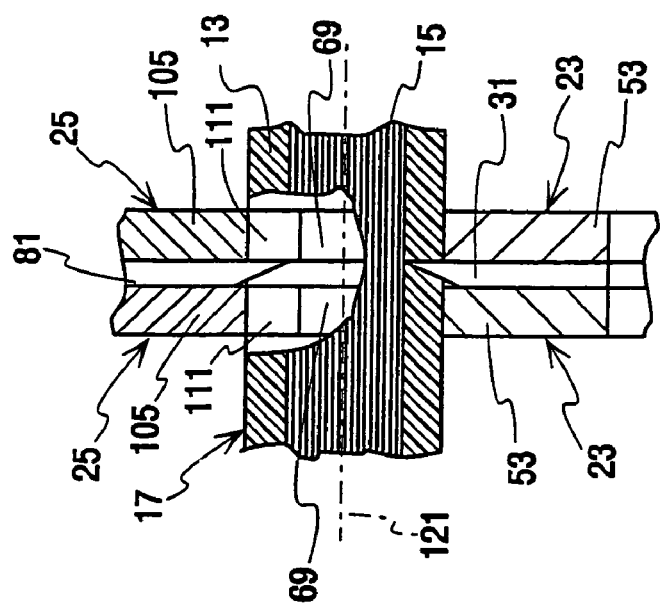
FIG. 5 is a partial cross-sectional view taken along line 5—5 of FIG. 3 and showing the blade assembly in its insulation supporting and cutting positions.

FIG. 5 of the drawings shows the actions of the blade holders 23, 25 and cutting blades 31, 81 coming together to cut the insulation 13 of the insulated wire 17 as depicted in FIGS. 3 and 4 of the drawings. It is clearly seen that the notches 61 and 111 formed in the insulation support plates 53, 105 come together above the center line 121 of the wire with lower support notch 61 providing greater support for the lower portion of the insulation 13 during the cutting of the insulation.

What is claimed is:

1. A laminated blade assembly for cutting insulation of a wire having insulation to permit removal of said insulation from said wire, said blade assembly including:
   a stationary member and movable member which are formed to contact each other when moved together to support and cut said insulation of said wire,
   each of said stationary and said removable members including a blade and a pair of wire insulation supports with said blade sandwiched between said supports,
   each of said supports having an edge of generally rectangular cross-section facing a similar edge of a similar support of its pair of supports,
   a plurality of grooves of different transverse cross-sectional sizes formed in each of said support edges with said grooves extending transversely of said support edges,
   said grooves of different sizes being spaced apart from one another in a direction longitudinally of said edges, said support grooves of similar transverse cross-sectional sizes aligned with one another,
   one of said stationary and said movable members being a lower member and the other being an upper member with said upper and lower members encircling said insulated wire when moved together,
   each of said grooves of said lower portion encircling more than one half of said cross-section of said insulated wire and each of said grooves of said upper portion encircling less than one half of said cross-section of said insulated wire when said support members are moved together,
   each of said blades having a sharpened longitudinally extending edge facing a similar sharpened edge of said other blade,
   a plurality of semi-circular grooves formed in each of said sharpened edges with said blade grooves extending transversely of said edges,
   said blade grooves being arranged apart from one another and aligned with associated aligned grooves in said supports,
   said sharpened edges of said blades being transversely offset relative to said edges of said supports when said blades are moved together to cut said insulation of said wire.

2. The laminated blade assembly of claim 1 in which said wire insulation supports are defined by a slot formed in each of said stationary and movable members, said slots receive said blades.

* * * * *